United States Patent
Entezari et al.

(10) Patent No.: US 9,608,960 B2
(45) Date of Patent: *Mar. 28, 2017

(54) SYSTEMS AND METHODS OF GEO-LOCATION BASED COMMUNITY OF INTEREST

(71) Applicant: Unisys Corporation, Blue Bell, PA (US)

(72) Inventors: Mehdi Entezari, Malvern, PA (US); Erik Arfvidson, Malvern, PA (US); Devon Andrew Beckett, Malvern, PA (US)

(73) Assignee: Unisys Corporation, Blue Bell, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/578,738

(22) Filed: Dec. 22, 2014

(65) Prior Publication Data
US 2016/0182452 A1    Jun. 23, 2016

(51) Int. Cl.
H04L 29/06 (2006.01)
H04L 29/08 (2006.01)
H04L 29/12 (2006.01)

(52) U.S. Cl.
CPC ...... *H04L 63/0254* (2013.01); *H04L 63/0236* (2013.01); *H04L 63/101* (2013.01); *H04L 63/107* (2013.01); *H04L 67/18* (2013.01); *H04L 61/609* (2013.01)

(58) Field of Classification Search
CPC ...... G06F 15/173; G06F 15/16; H04W 68/00; H04W 4/02; H04L 29/06; H04L 29/12009; H04L 29/12783; H04L 61/35; H04L 67/18; H04L 63/02; H04L 61/25; H04L 61/609; H04L 67/42; H04L 67/10; H04L 61/255; H04Q 7/38; H04M 3/16

USPC .......... 726/4, 13, 26, 30; 709/203-204, 709/222-224, 238, 245-246, 249; 455/410, 456.3

See application file for complete search history.

(56) References Cited

U.S. PATENT DOCUMENTS

| | | | |
|---|---|---|---|
| 6,466,779 B1 * | 10/2002 | Moles | H04L 63/02 455/410 |
| 7,200,658 B2 * | 4/2007 | Goeller | H04L 29/12009 709/217 |
| 9,026,145 B1 * | 5/2015 | Duleba | H04L 61/25 455/456.3 |
| 2013/0007256 A1 * | 1/2013 | Prieditis | H04L 41/12 709/224 |

* cited by examiner

*Primary Examiner* — Thanhnga B Truong
(74) *Attorney, Agent, or Firm* — Robert P. Marley

(57) ABSTRACT

The embodiments described herein recite a geo-location based community of interest (COI) system and method which add the capability to configure Network Connect Devices (NCD) to identify the location of the source and destination IP addresses. The NCDs would then drop any packets that are destined to an IP address outside of its predefined radius. For any sent/received packets, the geo-location position of the remote IP-address on the wide area network (WAN) may be determined. The distance between two points on the earth given their latitudes and longitudes of the devices may be determined. If the distance is greater than the predefined range, the data packets may be denied. If the distance falls within the pre-determined range, the data packets are allowed to reach their destination.

18 Claims, 8 Drawing Sheets

SYSTEMS AND METHODS OF GEO-LOCATION BASED COMMUNITY OF INTEREST

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

TECHNICAL FIELD

The present invention relates generally to geo-location based communities of interest.

BACKGROUND

The Internet of Things (IoT, also Cloud of Things or CoT) refers to the interconnection of uniquely identifiable embedded computing-like devices within the existing Internet infrastructure. Typically, IoT is expected to offer advanced connectivity of devices, systems, and services that goes beyond machine-to-machine communications (M2M) and covers a variety of protocols, domains, and applications. The interconnection of these embedded devices (including smart objects), is expected to usher in automation in nearly all fields, while also enabling advanced applications like a Smart Grid. These connected devices could be within a home (e.g. thermostat or garage door opener), a workplace (e.g. building thermostat or lights), or within a factory (gas sensors or machines).

According to Gartner, there will be nearly 26 billion devices on the IoT by 2020. ABI Research estimates that more than 30 billion devices will be wirelessly connected to the IoT by 2020. There are cases in which the information (data packets) sourced from electronic internet connected devices are consumed within a zone and/or a geographical area. The zone could be inside a building, a campus and/or a geographical area. In most cases, information provided by electronic internet connected devices needs to be consumed within a zone of interest. The security of the devices becomes a major issue when information provided with these devices could be harvested for malicious activities outside of the zone of interest. For example, a thermostat or metering devices connected to the internet may provide information to outsiders about when the households are home or away.

In order to solve this problem, it is advantageous to provide a secure network architecture to accommodate internet connected devices.

SUMMARY

It would thus be highly desirable to provide a geo-location based community of interest (COI) system and method. The embodiments described herein add the capability to configure Network Connect Devices (NCD) (e.g., routers, network hubs, or smart devices acting as a network) to identify the location of the source and destination IP addresses. The NCDs would then drop any packets that are destined to an IP address outside of its predefined radius. The consumer of this product would select the local IPs of the devices that this geo-location based COI feature applies to.

The NCD may be configured with the set of IP addresses that apply this feature. The location of the configured NCD may then be calculated. For any sent/received packets, the geo-location position of the remote IP-address on the wide area network (WAN) may be determined. The distance between two points on the earth given their latitudes and longitudes of the devices may be determined. If the distance is greater than the predefined range, the data packets may be denied. If the distance falls within the pre-determined range, the data packets are allowed to reach their destination.

In some implementations, a system and/or method implemented on a computer may comprise defining, at a host server, a geo-location of a source device internet protocol (IP) address; receiving, at the host server from the source device IP address, a request to send information to a destination device IP address; determining, by the host server, a location of the destination device IP address; when the location of the destination device IP address is within the geo-location of the source device IP address, transmitting, by the host server, the information to the destination device IP address; and when the location of the destination device IP address is outside the defined geo-location of the source device IP address, executing, by the host server, an analysis of the destination device IP address.

In other implementations, the system and/or method implemented on a computer may comprise receiving, by a router, selection on a user interface of a first device, the first device containing a unique internet protocol (IP) address; receiving, by the router, selection on the user interface of a type of first geo-location associated with the first device; receiving, by the router, selection on the user interface of the range of the geo-location associated with the first device; associating, by the router, the first device with the geo-location and the range of the geo-location; and permitting, by the router, access to the first device from an outside device within the first geo-location and the first range of the geo-location.

In yet other implementations, the system and/or method implemented on a computer may comprise storing, by a host server, a plurality of internet protocol (IP) addresses in a host database; receiving, by the host server, a request to send packets of information to a destination device IP address outside a geo-location surrounding a source device IP address; comparing, by the host server, the destination device IP address with the plurality of IP addresses; when the destination device IP address matches one of the plurality of IP addresses stored in the host database, sending, by the host server, the destination device IP address to the router to permit the router to send the destination device IP address the packets of information; and when the destination device IP address does not match one of the plurality of IP addresses stored in the host database, blocking, by the host server, the destination device IP address from the router.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

Figure 1:
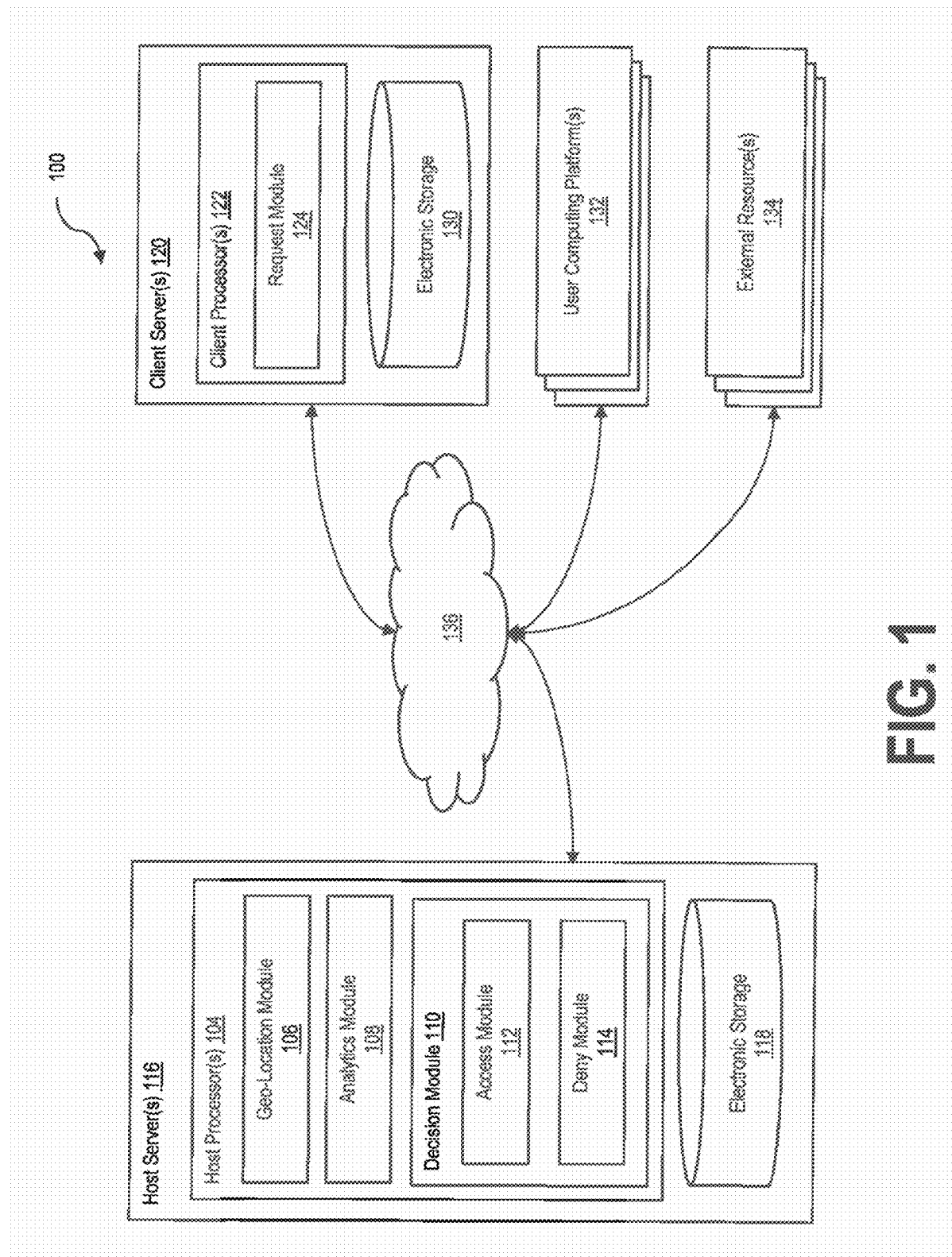
FIG. 1 illustrates a diagram of a system architecture for implementing a geo-location based community of interest, according to an exemplary embodiment.

FIG. 1 illustrates a diagram of a system 100 architecture for implementing a geo-location based community of interest, according to an exemplary embodiment. The system 100 may comprise a user computing platform(s) 132 communicating with a server(s) 116, 120 through a network 136. The server(s) 116, 120 may further communicate with external resource(s) 134. The server(s) 116, 120 may be any computing device communicatively coupled over a network 136 to one or more computing devices, such as user computing platform(s) 132 and external resource(s) 134.

The server(s) 116, 120 may comprise electronic storage 118, 130, one or more processor(s) 104, 122, and/or any other components. The server(s) 116, 120 may include communication lines, or ports to enable the exchange of information with a network 136 and/or other user computing platform(s) 132 and/or external resource(s) 134. The processor(s) 104, 122 may be configured to execute computer program modules. The processor(s) 104, 122 may be configured to execute the computer program modules via one or more of hardware, software, and/or firmware. Although system 100 may be described in certain sections herein as including server(s) 116, 120, this is not intended to be limiting. For example, server(s) 116, 120 may be implemented by a cloud of computing platforms operating together as server(s) 116, 120.

Processor(s) 104, 122 is configured to provide information processing capabilities in server(s) 116, 120. As such, processor(s) 104, 122 may include one or more of a digital processor, an analog processor, a digital circuit designed to process information, an analog circuit designed to process information, a state machine, and/or other mechanisms for electronically processing information. Although processor(s) 104, 122 is shown in FIG. 1 as a single entity, this is for illustrative purposes only. Processor(s) 104, 122 may include a plurality of processing units. These processing units may be physically located within the same device, or processor(s) 104, 122 may represent processing functionality of a plurality of devices operating in coordination. The processor(s) 104, 122 may be configured to execute: a geo-location module 106, an access module 112, a deny module 114, a request module 124, an analytics module 108, a decision module 110, and/or other modules. Processor(s) 104, 122 may be configured to execute any modules by software, hardware, firmware, some combination of software, hardware, and/or firmware, and/or other mechanisms for configuring processing capabilities on processor(s) 104, 122.

The server(s) 116, 120 and/or processor(s) 104, 122 may be separate and distinct from system 100, and may be provided by an entity that is separate from, for example, the entity providing system server(s) 116, 120. The server(s) 116, 120 and/or processor(s) 104, 122 may be configured to execute one or more computer program modules. The computer program modules may include one or more of a geo-location module 106, an access module 112, a deny module 114, a request module 124, an analytics module 108, a decision module 110, and/or other modules.

A geo-location module 106 when executed on a host processor(s) 104, may be configured to: define a geo-location. The host server may define a geo-location surrounding a source device internet protocol (IP) address. The source device may be a plurality of devices and/or a single device associated with the IP address. The plurality of devices may comprise: a computer, a smartphone, a tablet, a web-cam, a printer, a home appliance, a television, and/or a thermostat. In some implementations, the defined geo-location is a boundary within a city limit. In other implementations, the defined geo-location is a pre-selected radius surrounding the source device IP address. In yet other implementations, the defined geo-location is a boundary within a zip code.

The user interface on the user computing platform(s) 132 which is connected to a router, may receive selection of a first device which contains a unique IP address. The user interface may receive selection of a first device, second device, and/or a plurality of devices. The user interface on the user computing platform(s) 132 which is connected to a router may receive selection of a type of first geo-location associated with the first device, a type of second geo-location associated with a second device and/or a particular geo-location associated with a plurality of devices. The geo-location type may be a boundary within a city limit.

In other implementations, the geo-location type is a radius surrounding the first device IP address. The first device may be a plurality of devices associated with the IP address. In yet other implementations, the geo-location type is a boundary within a zip code. The first device may comprise at least one of: a computer, a smartphone, a tablet, a web-cam, a printer, a home appliance, a television, and/or a thermostat. In other implementations, the second device comprises at least one of: a computer, a smartphone, a tablet, a web-cam, a printer, a home appliance, a television, and a thermostat.

The user interface on the user computing platform(s) 132 which is connected to a router may receive selection of the range of the geo-location associated with the first device, second device, and/or a plurality of devices. The router may associate the first device, second device, and/or a plurality of devices with the geo-location and the range of the geo-location.

The host server may store a plurality of IP addresses in a host database. The plurality of IP addresses in the host database may be stored by user input and/or are automatically stored electronically. The host database may be stored in electronic storage 118 and/or any other storage.

A request module 124 when executed on a client processor(s) 122, may be configured to: receive the source IP address. The host server may receive from the source device IP address, a request to send information to a destination device IP address. The host server may receive a request to resolve a destination device IP address outside a geo-location surrounding a source device IP address. In some implementations, the geo-location is a boundary within a city limit. In other implementations, the geo-location is a radius surrounding the source device IP address. The source device may be a plurality of devices comprising a first device and a second device, the first device and the second device being different device types. The device types may comprise at least one of: a computer, a smartphone, a tablet, a web-cam, a printer, a home appliance, a television, and/or a thermostat. In yet other implementations, the geo-location is a boundary within a zip code.

An analytics module 108, when executed on a host processor(s) 104, may be configured to: determine the location of the destination device IP address. The host server may determine the location of the destination device IP address. The host server may compare the destination device IP with the plurality of IP addresses and make a determination whether to permit or deny access to information based on predefined rules based on the geo-location.

A decision module 110, when executed on a client processor(s) 122, may be configured to: determine whether to permit access and/or deny access to the destination device by making a determination and executing an access module 112 and/or a deny module 114. When the location of the destination device IP address is within the geo-location surrounding the source device IP address, the host server may permit the request to send information through executing the access module 112. In other implementations, the router may permit access to the first device, second device, and/or a plurality of devices from an outside device within the first, second, and/or pre-defined geo-location and the first, second, and/or pre-defined range of the geo-location. The host server may send the destination device IP address to the router to permit the router to send the destination device IP address packets of information when the destination device IP address matches one of the plurality of IP addresses stored in the host database.

When the location of the destination device IP address is outside the pre-defined geo-location surrounding the source device IP address, a second action and/or analysis may be executed. The second action and/or analysis may deny the request to send information, and the host server may deny the request to send information through executing the deny module 114. The host server may block the destination device IP address from the router when the destination device IP address does not match one of the plurality of IP addresses stored in the host database. In some implementations, blocking does not permit the router to send the destination device IP address packets of information to the source device.

The second action and/or analysis may determine if the destination device is a preselected device. When the destination device is a preselected device, sending a request to a host server. The request may be to resolve a destination IP address outside a pre-defined geo-location surrounding a source device IP address.

Although modules 106, 108, 110, 112, 114, and 124, are illustrated in FIG. 1 as being co-located within a single processing unit, in implementations in which processor(s) 104, 122 includes multiple processing units, one or more of modules 106, 108, 110, 112, 114, and 124, and/or other modules may be located remotely from the other modules. The description of the functionality provided by the different described above is for illustrative purposes, and is not intended to be limiting, as any of modules 106, 108, 110, 112, 114, and 124, and/or other modules may provide more or less functionality than is described. For example, one or more modules 106, 108, 110, 112, 114, and 124, and/or other modules may be eliminated, and some or all of its functionality may be provided by other ones of 106, 108, 110, 112, 114, and 124, and/or other modules. As another example, processor(s) 104, 122 may be configured to execute one or more additional modules that may perform some or all of the functionality attributed below to one of 106, 108, 110, 112, 114, and 124, and/or other modules.

Electronic storage 118, 130 may comprise electronic storage media that electronically stores information. The electronic storage media of electronic storage 118, 130 may include one or both of system storage that is provided integrally (i.e., substantially non-removable) with server(s) 116, 120 and/or removable storage that is removably connectable to server(s) 116, 120 via, for example, a port (e.g., a USB port, a firewire port, etc.) or a drive (e.g., a disk drive, etc.). Electronic storage 118, 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118, 130 may include one or more virtual storage resources (e.g., cloud storage, a virtual private network, and/or other virtual storage resources). Electronic storage 118, 130 may store software algorithms, information determined by processor(s) 104, 122, information received from server(s) 116, 120, information received from user computing platform(s) 132, and/or other information that enables server(s) 116, 120 to function as described herein.

The computer program modules may be configured to enable an expert or user associated with the given user computing platform(s) 132 to interface with system 100 and/or external resource(s) 134, and/or provide other functionality attributed herein to user computing platform(s) 132.

In the exemplary embodiment, user computing platform(s) 132 may be any computing devices comprising processors and software modules capable of executing the processes and tasks described herein. Non-limiting examples of user computing platform(s) 132 may include a desktop computer, a laptop computer, a handheld computer, a tablet computing platform, a netbook, a smartphone, a gaming console, and/or other computing platforms. In other embodiments, user computing platform(s) 132 may be a variety of electronic computing devices.

Each of the user computing platform(s) 132 may have distinct operating systems, or platforms. The user computing platform(s) 132 may be executing the same platform or the user computing platform(s) 132 may be executing different platforms. The user computing platform(s) 132 may be capable of executing multiple platforms. In some embodiments, user computing platform(s) 132 may be used by a software developer, user and/or other system administrator to control the server 102, over a network 136. In other embodiments, user computing platform(s) 132 may be targeted to receive test modules to execute.

A user may interact with a user interface that resides directly on the server(s) 116, 120 for system administration and control. In other embodiments, user computing platform(s) 132 may be used to remotely conduct system administration. A given user computing platform(s) 132 may include one or more processor(s) 104, 122 configured to execute computer program modules.

The external resource(s) 134 may include sources of information, hosts and/or providers of environments outside of system 100, external entities participating with system 100, and/or other resources. In some implementations, some or all of the functionality attributed herein to external resource(s) 134 may be provided by resources included in system 100.

The network 136 may comprise any common communication architecture that facilitates communication between computing devices, which in this embodiment the computing devices would be the server(s) 116, 120 and the user computing platform(s) 132. One having ordinary skill in the art would appreciate that the network 136 may be the Internet, a private intranet, or some hybrid of the two.

Figure 2:
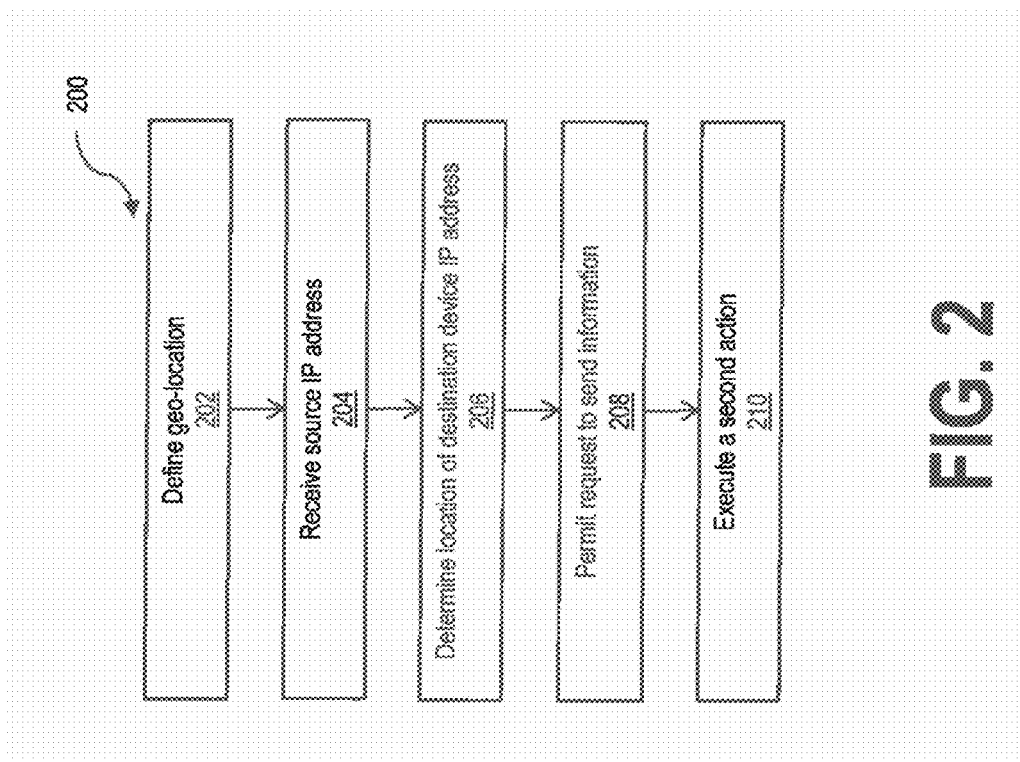
FIG. 2 illustrates a flow chart showing steps for a method for implementing a geo-location based community of interest, according to an exemplary embodiment.

FIG. 2 illustrates a flow chart 200 showing steps for a method for implementing a geo-location based community of interest, according to an exemplary embodiment.

The method for implementing a geo-location based community of interest, may be accomplished with one or more additional steps not described, and/or without one or more of the steps discussed. Additionally, the order in which the steps of the method for implementing a geo-location based community of interest, are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 200 in response to instructions stored electronically on an electronic storage medium. The one or more processing devices may include one or more devices configured through hardware, firmware, and/or software to be specifically designed for execution of one or more of the steps of method 200.

At step 202, the geo-location may be defined. The host server may define a geo-location surrounding a source device internet protocol (IP) address. The source device may be a plurality of devices and/or a single device associated with the IP address. The plurality of devices may comprise: a computer, a smartphone, a tablet, a web-cam, a printer, a home appliance, a television, and/or a thermostat.

The defined geo-location may be a boundary within a city limit. In other implementations, the defined geo-location is a pre-selected radius surrounding the source device IP address. In yet other implementations, the defined geo-location is a boundary within a zip code. Step 202 may be performed by a geo-location module the same as or similar to geo-location module 106 (shown in FIG. 1 and described above).

At step 204, the source IP address may be received. The host server may receive from the source device IP address, a request to send information to a destination device IP address. Step 204 may be performed by a request module the same or similar to request module 124 (shown in FIG. 1 and described above).

At step 206, the location of the destination device IP address may be determined. The host server may determine the location of the destination device IP address. Step 206 may be performed by an analytics module the same or similar to analytics module 108 (shown in FIG. 1 and described above).

At step 208, the request to send information may be permitted. When the location of the destination device IP address is within the geo-location surrounding the source device IP address, the host server may permit the request to send information. Step 208 may be performed by decision module the same or similar to decision module 110 and/or access module 112 (shown in FIG. 1 and described above).

At step 210, a second action may be executed. When the location of the destination device IP address is outside the pre-defined geo-location surrounding the source device IP address, a second action and/or analysis may be executed. The second action and/or may be denying the request to send information. In other implementations, the second action and/or analysis may determine if the destination device is a preselected device. When the destination device is a preselected device, sending a request to a host server. The request may be to resolve a destination IP address outside a pre-defined geo-location surrounding a source device IP address. Step 210 may be performed by decision module the same or similar to decision module 110, access module 112, and/or deny module 114 (shown in FIG. 1 and described above).

Figure 3:
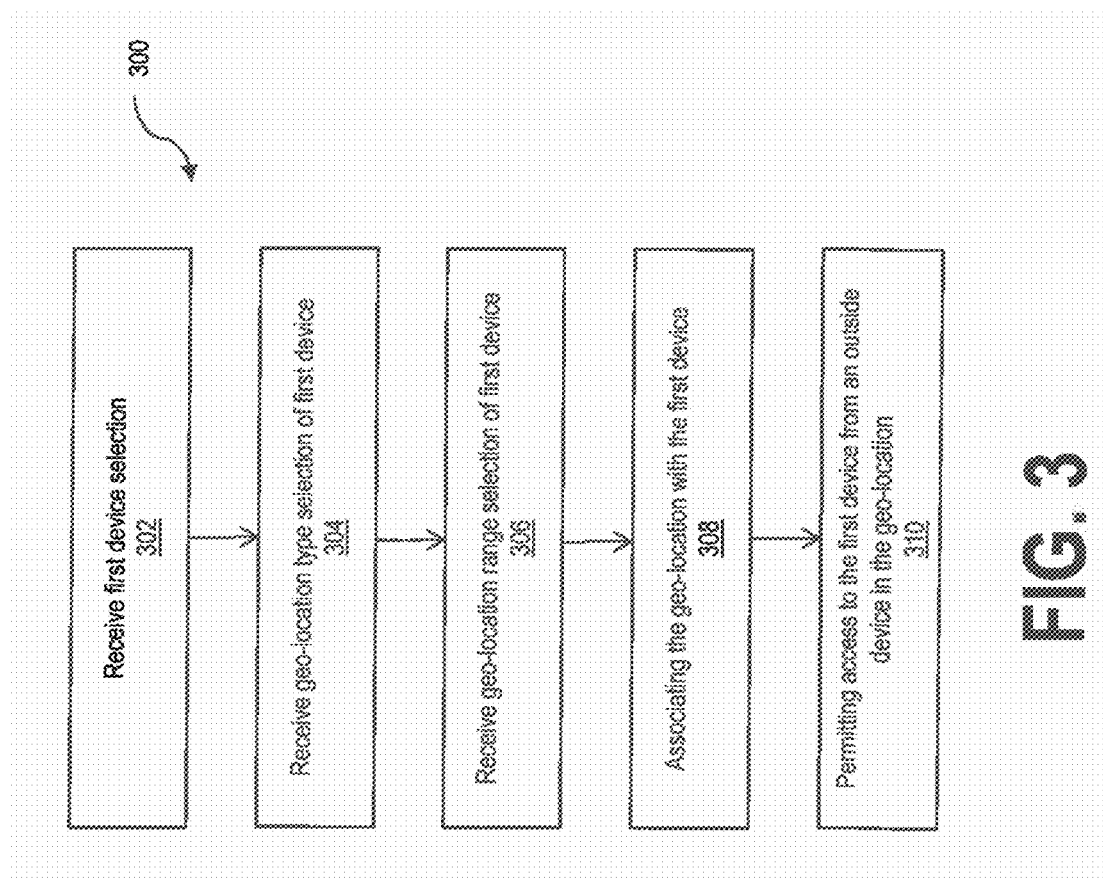
FIG. 3 illustrates a flow chart showing steps for a method for implementing a geo-location based community of interest, according to an exemplary embodiment.

FIG. 3 illustrates a flow chart 300 showing steps for a method of implementing a geo-location based community of interest, according to an exemplary embodiment. In some embodiments, the method for implementing a geo-location based community of interest, may be accomplished with one or more additional steps not described, and/or without one or more of the steps discussed. Additionally, the order in which the steps of the method for implementing a geo-location based community of interest, are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 300 in response to instructions stored electronically on an electronic storage medium. The one or more processing devices may include one or more devices configured through hardware, firmware, and/or software to be specifically designed for execution of one or more of the steps of method 300.

At step 302, selection of a first device, second device, and/or a plurality of devices may be received. The user interface on the user computing platform(s) 132 which is connected to a router, may receive selection of a first device which contains a unique IP address. The user interface may receive selection of a first device, second device, and/or a plurality of devices. Step 302 may be performed by a geo-location module the same as or similar to geo-location module 106 (shown in FIG. 1 and described above).

At step 304, the geo-location type selection of the first device, second device, and/or a plurality of devices may be received. The user interface on the user computing platform(s) 132 which is connected to a router may receive selection of a type of first geo-location associated with the first device, a type of second geo-location associated with a second device and/or a particular geo-location associated with a plurality of devices.

The geo-location type may be a boundary within a city limit. The geo-location type may be a radius surrounding the first device IP address. The first device may be a plurality of devices associated with the IP address. In yet other implementations, the geo-location type is a boundary within a zip code.

The first device may comprise at least one of: a computer, a smartphone, a tablet, a web-cam, a printer, a home appliance, a television, and/or a thermostat. In other implementations, the second device comprises at least one of: a computer, a smartphone, a tablet, a web-cam, a printer, a home appliance, a television, and a thermostat. Step 304 may be performed by a geo-location module the same as or similar to geo-location module 106 (shown in FIG. 1 and described above).

At step 306, the geo-location range selection of the first device, second device, and/or a plurality of devices may be received. The user interface on the user computing platform(s) 132 which is connected to a router may receive selection of the range of the geo-location associated with the first device, second device, and/or a plurality of devices. Step 306 may be performed by a geo-location module the same as or similar to geo-location module 106 (shown in FIG. 1 and described above).

At step 308, the geo-location may be associated with the first device, second device, and/or a plurality of devices. The router may associate the first device, second device, and/or a plurality of devices with the geo-location and the range of the geo-location. Step 308 may be performed by a geo-location module the same as or similar to geo-location module 106 (shown in FIG. 1 and described above).

At step 310, the access to the first device, second device, and/or a plurality of devices from an outside device in the geo-location may be permitted. The router may permit access to the first device, second device, and/or a plurality of devices from an outside device within the first, second, and/or pre-defined geo-location and the first, second, and/or pre-defined range of the geo-location. Step 310 may be performed by a decision module the same as or similar to decision module 110 and access module 112 (shown in FIG. 1 and described above).

Figure 4:
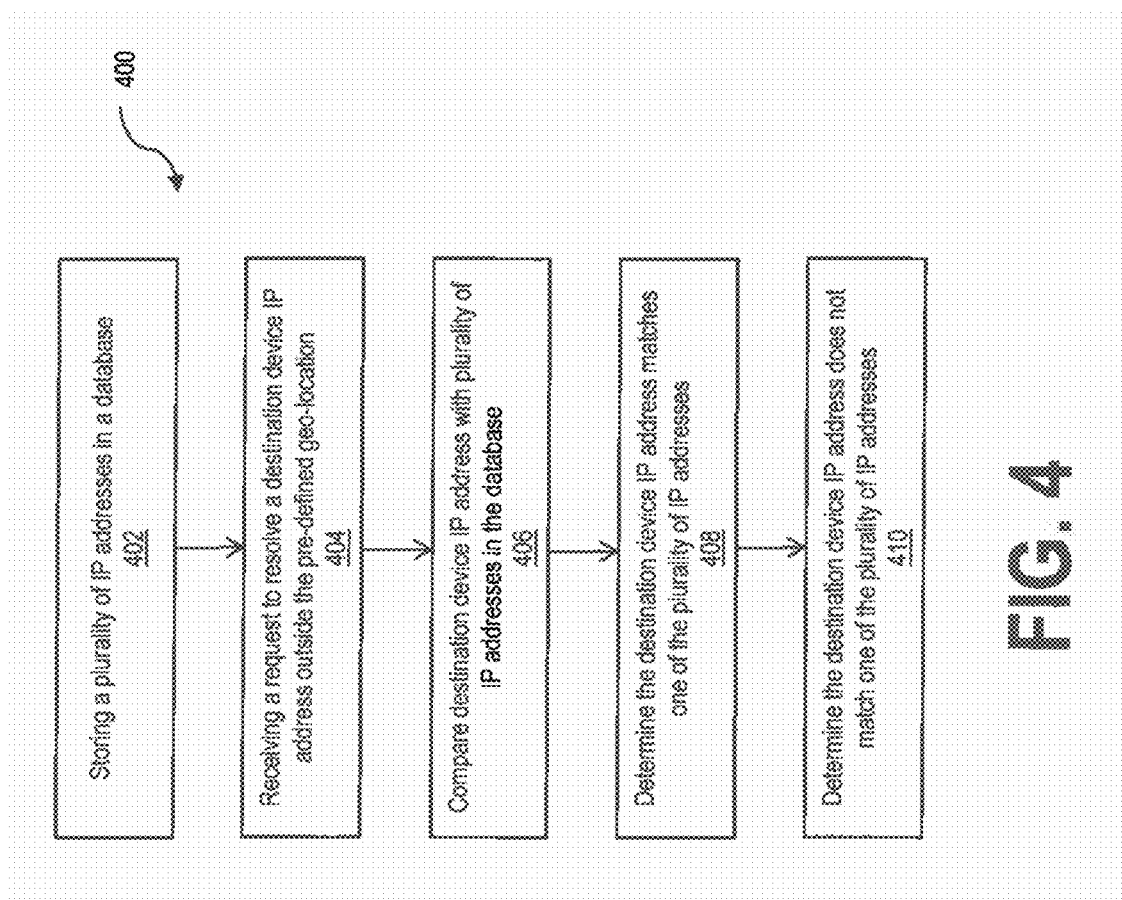
FIG. 4 illustrates a flow chart showing steps for a method for implementing a geo-location based community of interest, according to an exemplary embodiment.

FIG. 4 illustrates a flow chart 400 showing steps for a method of implementing a geo-location based community of interest, according to an exemplary embodiment. In some embodiments, the method for implementing a geo-location based community of interest, may be accomplished with one or more additional steps not described, and/or without one or more of the steps discussed. Additionally, the order in which the steps of the method for implementing a geo-location based community of interest, are illustrated in FIG. 4 and described below is not intended to be limiting.

Method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method in response to instructions stored electronically on an electronic storage medium. The one or more processing devices may include one or more devices configured through hardware, firmware, and/or software to be specifically designed for execution of one or more of the steps of method 400.

At step 402, a plurality of IP addresses in a database may be stored. The host server may store a plurality of IP addresses in a host database. The plurality of IP addresses in the host database may be stored by user input and/or are automatically stored electronically. In some implementations, the host database may be stored in electronic storage 118 and/or any other storage. Step 402 may be performed by a geo-location module the same as or similar to geo-location module 106 (shown in FIG. 1 and described above).

At step 404, a request to resolve a destination IP address outside the pre-defined geo-location may be received. The host server may receive a request to resolve a destination device IP address outside a geo-location surrounding a source device IP address. The geo-location may be a boundary within a city limit. In other implementations, the geo-location is a radius surrounding the source device IP address. The source device may be a plurality of devices comprising a first device and a second device, the first device and the second device being different device types. The device types comprise at least one of: a computer, a smartphone, a tablet, a web-cam, a printer, a home appliance, a television, and/or a thermostat. In yet other implementations, the geo-location is a boundary within a zip code. Step 404 may be performed by may be performed by a request module the same as or similar to request module 124 (shown in FIG. 1 and described above).

At step 406, the destination device IP address may be compared with the plurality of IP addresses in the database. The host server may compare the destination device IP with the plurality of IP addresses. Step 406 may be performed by an analytics module the same as or similar to analytics module 108 (shown in FIG. 1 and described above).

At step 408, a determination that the destination device IP addresses matches one of the plurality of IP addresses may be made. The host server may send the destination device IP address to the router to permit the router to send the destination device IP address packets of information when the destination device IP address matches one of the plurality of IP addresses stored in the host database. Step 408 may be performed by an access module the same or similar to access module 112 and decision module 110 (shown in FIG. 1 and described above).

At step 410, a determination that the destination device IP address does not match one of the plurality of IP addresses may be made. The host server may block the destination device IP address from the router when the destination device IP address does not match one of the plurality of IP addresses stored in the host database. Blocking may not permit the router to send the destination device IP address packets of information to the source device. Step 410 may be performed by a deny module the same or similar to deny module 114 and decision module 110 (shown in FIG. 1 and described above).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 5:
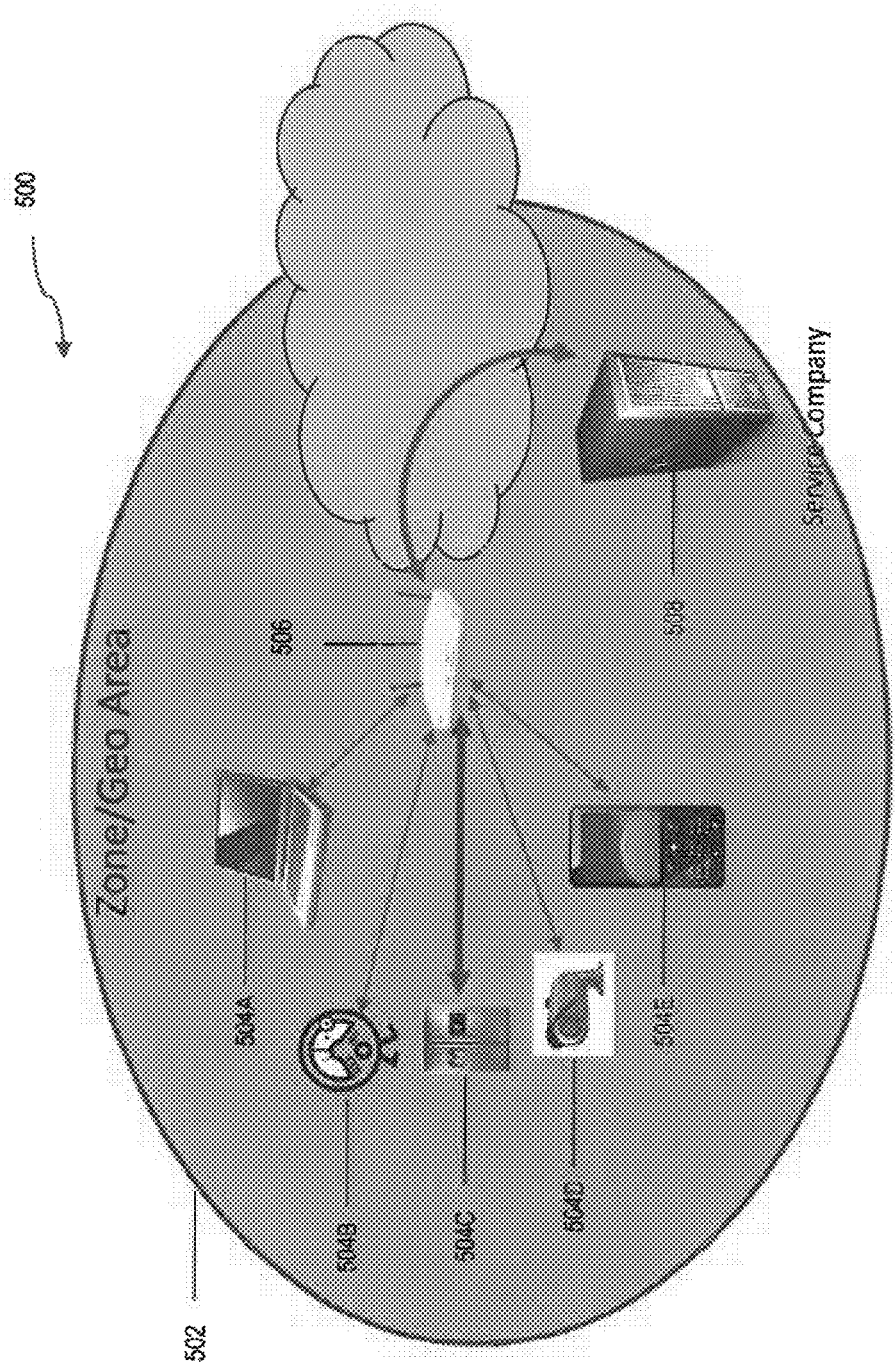
FIG. 5 illustrates a diagram of a system architecture for implementing a geo-location based community of interest, according to an exemplary embodiment.

FIG. 5 illustrates a diagram of a system architecture 500 for implementing a geo-location based community of interest, according to an exemplary embodiment. In some embodiments, the method and/or system for implementing a geo-location based community of interest, may be accomplished with one or more additional steps not described, and/or without one or more of the steps discussed. Additionally, the order in which the system elements for implementing a geo-location based community of interest as illustrated in FIG. 5 and described below is not intended to be limiting.

In most cases, the information [data packets] sourced from devices 504A, 504B, 504C, 504D, 504E are consumed within a local proximity area 502. These zones could potentially be for example inside a building, a campus or a geographical area. Thus, information provided by IoT devices can be limited within a zone of interest (or geo-location Based community of interest (COI)).

The system provides an opportunity to contain and limit the access to the data provided by these devices. The system may provide an end-to-end solution. For example, the system may contain a software component that resides in home routers. The system may host a backend that acts as a DNS to routers and IoT devices.

The system may provide the capability to configure network connect devices (NCD) 506 (e.g. routers, network hubs, or smart devices acting as a network) to identify the location of the source and destination IP addresses. The system would then drop any packets that are destined to an IP address outside of its predefined radius. The consumer of this product would select the local IPs of the devices 504A, 504B, 504C, 504D, 504E that this geo-location based COI feature applies to.

The system may configure the NCD 506 with the set of IPs that this feature will apply to, and calculate the location of the configured NCD 506. On any Sent/Received packets, the system may determine the geo-location position of the remote IP-address on the wide-area network (WAN) 508. The system may calculate the distance between two points on the earth given their latitudes and longitudes. If the distance is greater than the predefined range, the system may deny the packet. If the distance is within the predefined range, the system may allow the packet to reach its destination.

This may be utilized for example when an appliance (e.g. HVAC system 504B) requires maintenance. The appliance 504B sends maintenance packet to the Service Company website within the specified zone 508. The local router 506 may determine that this device is within the zone. The router 506 may allows communication to the destination IP.

Figure 6:
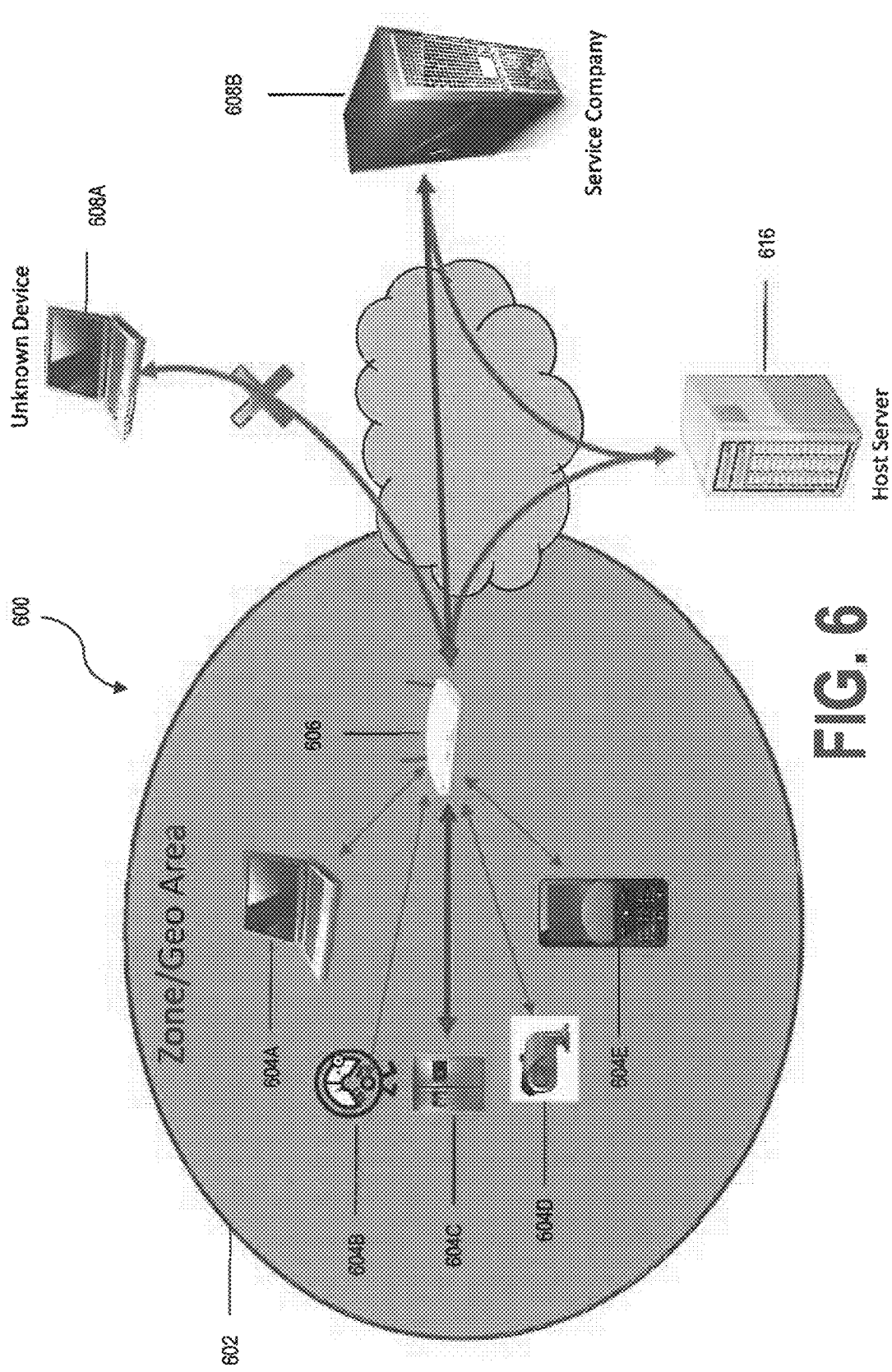
FIG. 6 illustrates a diagram of a system architecture for implementing a geo-location based community of interest, according to an exemplary embodiment.

FIG. 6 illustrates a diagram of a system architecture 600 for implementing a geo-location based community of interest, according to an exemplary embodiment. In some embodiments, the method and/or system for implementing a geo-location based community of interest, may be accomplished with one or more additional steps not described, and/or without one or more of the steps discussed. Additionally, the order in which the system elements for implementing a geo-location based community of interest as illustrated in FIG. 6 and described below is not intended to be limiting.

The authentication system may interact as an authentication server to initiate communication between devices 604A, 604B, 604C, 604D, 604E inside a geo-location CoI 602 and remote device 608A (e.g. personal smart devices) or remote service providers 608B (e.g. HVAC service company).

For example, when an appliance (e.g. Refrigerator) 604C requires maintenance, the appliance 604C sends maintenance packet to the Service Company website. The local router 606 may determines that this device 608B is one of the preselected devices and destination is outside its geographical area. The router 606 communicates to host server 616 to resolve Destination URL. The host server 610 acts as a domain name-server and returns the Service Company IP. The router 606 may then allow the packets to the destination IP to be delivered for a period of time. The period of time may be pre-determined by the host server, may be selected by the operator, and/or may be set by a user.

Figure 7:
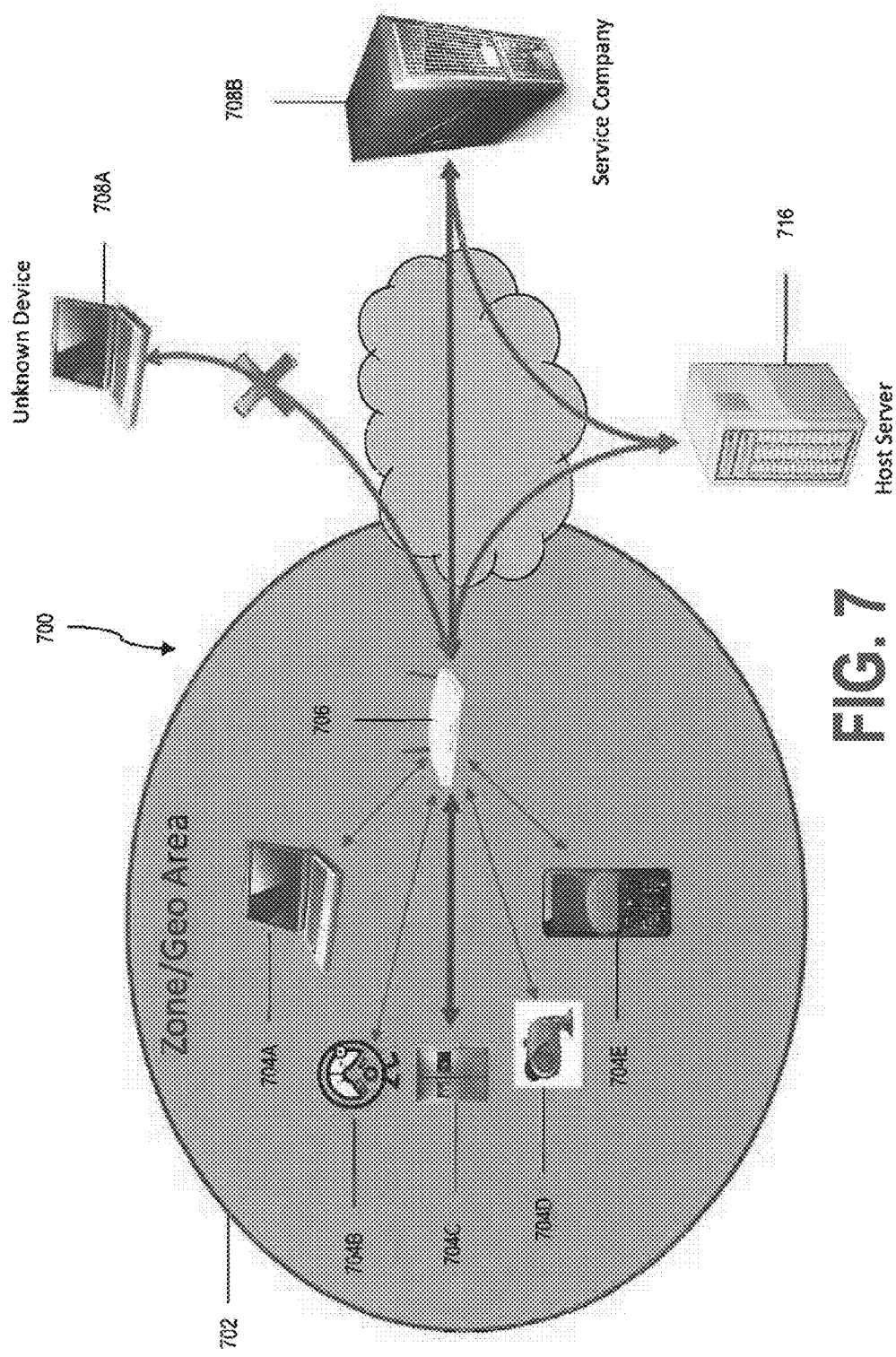
FIG. 7 illustrates a diagram of a system architecture for implementing a geo-location based community of interest, according to an exemplary embodiment.

FIG. 7 illustrates a diagram of a system architecture 700 for implementing a geo-location based community of interest, according to an exemplary embodiment. In some embodiments, the method and/or system for implementing a geo-location based community of interest, may be accomplished with one or more additional steps not described, and/or without one or more of the steps discussed. Additionally, the order in which the system elements for implementing a geo-location based community of interest as illustrated in FIG. 7 and described below is not intended to be limiting.

For example, an endpoint 708A wants to access at least one of the protected devices 704A, 704B, 704C, 704D, 704E. The local router 706 may determine that this device 708A is one of the preselected devices and source IP is outside its geographical area 702. The router 706 may communicate to the host server 716 to resolve Destination URL. The host server 716 may act as a domain name-server and sends a failed-verification status back to the local router 706. The router 706 may drop packets sourced by the unknown IP address.

Figure 8:
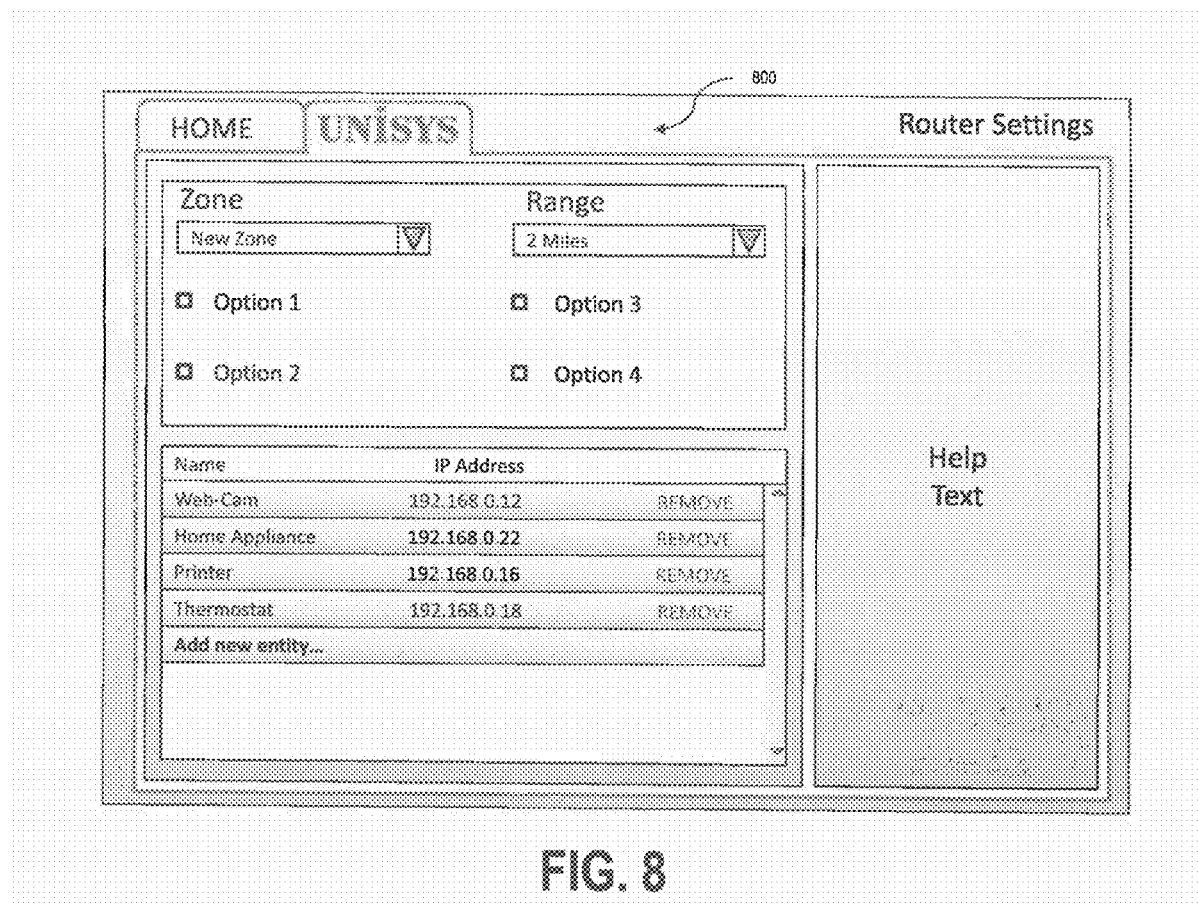
FIG. 8 illustrates a user interface for implementing a geo-location based community of interest, according to an exemplary embodiment.

FIG. 8 illustrates a user interface 800 for implementing a geo-location based community of interest, according to an exemplary embodiment. In some embodiments, the method and/or system for implementing a geo-location based community of interest, may be accomplished with one or more additional steps not described, and/or without one or more of the steps discussed. Additionally, the order in which the system elements for implementing a geo-location based community of interest as illustrated in FIG. 8 and described below is not intended to be limiting.

User interface 800 is an example of graphical user interface (GUI) of the software provided on the user computing platform(s) 132. The user may select an item (e.g., home appliance such as the refrigerator) and set up a geo-location radius for the router. The GUI may allow the user to allowing only incoming traffic and/or outgoing traffic (e.g., allow the service company to send information to the refrigerator and/or allow the service company to receive information from the refrigerator). The GUI may allow the user to add devices to zones and limit them to options based on the radius.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Although certain illustrative, non-limiting exemplary embodiments have been presented, various changes, substitutions, permutations, and alterations can be made without departing from the scope of the appended claims. Further, the steps of the methods described herein may be carried out in any suitable order, or simultaneously where appropriate. Thus, the scope of the invention should not necessarily be limited by this description. The scope of the present invention is instead defined by the following claims.

Unless specifically stated otherwise as apparent from the following discussion, it is appreciated that throughout the description, discussions utilizing terms such as "processing," "computing," "transmitting," "receiving," "determining," "displaying," "identifying," "presenting." "establishing," or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes and/or be selectively activated or reconfigured by computer executable instructions stored in nontransitory computer memory medium.

It is to be appreciated that the various components of the technology can be located at distant portions of a distributed network and/or the Internet, or within a dedicated secured, unsecured, addressed/encoded and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term "module" as used herein can refer to any known or later developed hardware, software, firmware, or combination thereof that is capable of performing the functions associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Presently preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer implemented method comprising:
   storing, by a host server, a plurality of internet protocol (IP) addresses in a host database;
   receiving, by the host server, a request to send packets of information to a destination device IP address outside a geo-location surrounding a source device IP address;
   comparing, by the host server, the destination device IP address with the plurality of IP addresses;
   when the destination device IP address matches one of the plurality of IP addresses stored in the host database, sending, by the host server, the destination device IP address to a network connect device to permit the network connect device to send the destination device IP address the packets of information;
   when the destination device IP address does not match one of the plurality of IP addresses stored in the host database, determining, by the host server, whether the destination device is a preselected device to permit the network connect device to send the destination device the packets of information; and
   when the destination device IP address does not match one of the plurality of IP addresses stored in the host database and is not the preselected device, blocking, by the host server, the destination device IP address from the network connect device.

2. The method of claim 1, wherein the geo-location is a boundary within a city limit.

3. The method of claim 1, wherein the geo-location is a radius surrounding the location of the source device IP address.

4. The method of claim 1, wherein the geo-location is a boundary within a zip code.

5. The method of claim 1, wherein the source device is selected from the group consisting of a first device and a second device, the first device and the second device being different device types.

6. The method of claim 5, wherein the device types are selected from a group consisting of a computer, a smartphone, a tablet, a web-cam, a printer, a home appliance, a television, and a thermostat.

7. The method of claim 1, wherein blocking does not permit the network connect device to send the destination device IP address packets of information to the source device.

8. The method of claim 1, wherein the plurality of IP addresses in the host database are stored by user input.

9. The method of claim 1, wherein the plurality of IP addresses in the host database are automatically stored.

10. A host server comprising:
a processor configured to:
store a plurality of internet protocol (IP) addresses in a host database;
receive a request to resolve a destination device IP address outside a geo-location surrounding a source device IP address; and
compare the destination device IP address with the plurality of IP addresses;
when the destination device IP address matches one of the plurality of IP addresses stored in the host database, sending the destination device IP address to a network connect device to permit the network connect device to send the destination device IP address packets of information;
when the destination device IP address does not match one of the plurality of IP addresses stored in the host database, determining, by the host server, whether the destination device is a preselected device to permit the network connect device to send the destination device the packets of information, and
when the destination device IP address does not match one of the plurality of IP addresses stored in the host database and is not the preselected device, blocking the destination device IP address from the network connect device.

11. The system of claim 10, wherein the geo-location is a boundary within a city limit.

12. The system of claim 10, wherein the geo-location is a radius surrounding the location of the source device IP address.

13. The system of claim 10, wherein the geo-location is a boundary within a zip code.

14. The system of claim 10, wherein the source device is selected from the group consisting of a first device and a second device, the first device and the second device being different device types.

15. The system of claim 10, wherein the device types are selected from the group consisting of a computer, a smartphone, a tablet, a web-cam, a printer, a home appliance, a television, and a thermostat.

16. The system of claim 10, wherein blocking does not permit the network connect device to send the destination device IP address packets of information to the source device.

17. The system of claim 10, wherein the plurality of IP addresses in the host database are stored by user input.

18. The system of claim 10, wherein the plurality of IP addresses in the host database are automatically stored.

* * * * *